United States Patent [19]
Col et al.

[11] 4,279,118

[45] Jul. 21, 1981

[54] FRUIT HARVESTING MACHINE WITH BIN FILLING SYSTEM

[75] Inventors: Martin H. Col; Ronald L. Peters, both of Modesto, Calif.

[73] Assignee: FMC Corporation, San Jose, Calif.

[21] Appl. No.: 111,509

[22] Filed: Jan. 11, 1980

[51] Int. Cl.³ .............................................. A01G 19/06
[52] U.S. Cl. ...................................... 56/329; 198/369
[58] Field of Search .................. 56/329; 198/371, 369; 53/202, 247, 259; 414/269, 272, 53

[56] References Cited

U.S. PATENT DOCUMENTS

| | | | |
|---|---|---|---|
| 2,743,826 | 5/1956 | Aschenwald | 414/272 |
| 3,365,083 | 1/1968 | Bavmann et al. | 198/369 |
| 3,596,455 | 8/1971 | Adrian | 56/329 |
| 3,608,292 | 9/1971 | Perry | 56/329 |

Primary Examiner—Robert A. Hafer
Attorney, Agent, or Firm—R. S. Kelly

[57] ABSTRACT

An improved fruit harvester, including a self-propelled main frame with means for grasping a fruit tree and inducing vibration in the fruit tree so that fruit will be caused to fall and a retractable collection surface which extends beneath the tree to gather the fruit as it falls. The gathered fruit is directed to either of two longitudinal conveyors disposed on each side of the main frame which transport the fruit to the rear of the harvester. A transversely mounted conveyor is disposed between the respective termination points of each of the longitudinal conveyors and is capable of selectively receiving fruit from either of the two longitudinal conveyors and depositing said fruit in either of two receptacles elevatably supported at the corners of the main frame of the harvester.

10 Claims, 10 Drawing Figures

FIG_1

FIG_3

FIG_9

FIG_10

FRUIT HARVESTING MACHINE WITH BIN FILLING SYSTEM

BACKGROUND OF THE INVENTION

1. Field of the Invention

This invention relates to apparatus for harvesting fruit or the like, and more particularly, to a fruit harvester which includes a system for the selective filling and handling of storage bins used to transport the fruit from the orchard.

2. Description of the Prior Art

A number of patents have been issued on fruit harvesting machines which combine a device for shaking the fruit tree together with a means for collecting the fruit as it falls. The advantages of these machines lie in their greatly decreased need for human labor and the consequent savings in harvesting costs. One such fruit harvesting machine is described in the U.S. patent to Adrian (U.S. Pat. No. 3,596,455). The machine disclosed therein, although complex in design, combines a series of easily understood operations. The harvester, which is mobile, proceeds between two rows of fruit trees gathering fruit alternately from trees on either side. A means for grasping and shaking an individual tree is provided on the front end of the fruit harvester. Once the fruit harvester is in place, a structure resembling an inverted umbrella extends beneath the circumference of the tree, forming a large surface to catch the fruit as it falls. The tree is then shaken causing the fruit to fall into the "umbrella". The catching surface is inclined so that the fruit falls by gravity toward its center where the fruit collects on one of two conveyor belts located on each side of the shaker mechanism and running parallel to the vehicle axis. The fruit is continuously transported to the rear of the vehicle where it is collected into a single bin supported by a pair of forks cantilevered from the rear of the vehicle.

The fruit harvester itself, of course, is only part of the total operation involved in retrieving fruit from the various trees and collecting that fruit at a central point in the orchard where it may be loaded onto trucks and transported to market. The remainder of that operation requires people and machines to continually pick up full fruit bins and provide empty bins so that the fruit harvester may continue to operate. In particular, a vehicle is required to carry bins between the field and the central collection point.

A problem with dual-conveyor harvesters previously available has been difficulty in coordinating the location of the bin-feeding vehicle with that of the harvester so that an empty bin is available when and where required by the harvester. This is because the dual-conveyor design lends itself to utilization of a single fruit collection bin on the harvester. Since only one bin is available on the machine, an empty bin must be available immediately upon the filling of the bin then in place on the fruit harvester. Since bins are filled in a matter of minutes, the bin-feeding vehicle is often enroute to or from the central collection point at the time a new bin is required by the fruit harvester. This causes the fruit harvester to remain idle while waiting for delivery of an empty bin. This problem is accentuated when the fruit bins are filled with chilled water in order to preserve fruit, such as cherries, which deteriorate rapidly unless cooled promptly after harvesting. Such bins, weighing several thousand pounds, must be handled entirely by machine and the simultaneous presence of both the feeder and the harvester is required to effect a transfer. Often either the bin-feeding vehicle or the harvester is forced to wait for the other until the time comes to transfer the bin and the result is inefficient use of the equipment.

A second disadvantage of the prior art is the necessity of having one or more persons standing near the empty fruit bin to assist in loading this fruit bin onto the fruit harvester. Often an empty bin which is not water-filled will be left by the bin-feeding vehicle at a point that is remote from the location of the harvester when a new bin is required. The bin is then manually carried to the harvester so that idle time will be minimized. This, of course, requires additional labor.

A fruit harvester capable of carrying two fruit bins is disclosed in U.S. Pat. No. 3,683,617 issued to Vallicella. That harvester utilizes a single longitudinally oriented conveyor to transport fruit from the collection surface to the rear where a baffle selectively deflects the fruit into either of two bins. This approach is unworkable on a harvester utilizing dual conveyors with termination points some distance apart.

SUMMARY OF THE INVENTION

The inefficiency of the prior art systems is avoided by the present invention which allows the fruit harvester to carry two bins at one time. Since each of these bins may be transferred onto or off of the harvester independently, the bin-feeder need not be present at the time of transfer.

It is an object of this invention to provide a fruit harvester with a parallel conveying system capable of carrying two selectively loadable bins to receive the harvested fruit.

It is a further object of this invention to provide a dual conveyor fruit harvester capable of carrying two bins to receive the harvested fruit wherein each bin can be selectively loaded and unloaded from the harvester.

It is a further object of this invention to provide a fruit harvester capable of loading and unloading each of two bins solely by the efforts of the operator of the harvester without any assistance from others.

It is a further object of this invention to provide a fruit harvester with improved stability through better weight distribution.

The present invention achieves the above-stated objectives by providing means of support for two fruit bins such that each fruit bin will be located at the end of one of the two parallel fruit conveyors on the fruit harvesting machine. The location is such that each of the parallel fruit conveyors discharges directly into one of the bins when they are loaded on the harvester. Means are then provided for selectively intercepting the fruit from either of the two parallel fruit conveyors and transporting the fruit so that it is deposited in the bin associated with the opposite conveyor. In the preferred arrangement this means comprises an additional conveyor mounted transversely on the rear of the fruit harvester in a manner that allows the conveyor to be shifted from side to side. In one position, the transverse conveyor is located so that fruit being discharged from the right hand side fruit conveyor falls onto the transverse conveyor and is transported to the left hand side of the fruit harvester, discharging into the left hand side fruit bin. In this configuration, all fruit being harvested at one time will fill the left hand side fruit bin. Means are provided so that the transverse conveyor may be shifted to receive fruit being discharged by the left hand side fruit conveyor while the direction of movement of the transverse conveyor is reversed so that fruit from the left hand side conveyor will be transported to the right hand side fruit bin and discharged. In the second configuration, all fruit being harvested at one time is directed to the right hand side fruit bin. Each bin is supported so that it may be loaded or unloaded while leaving the other bin in place.

DESCRIPTION OF THE PREFERRED EMBODIMENT

Figure 1:
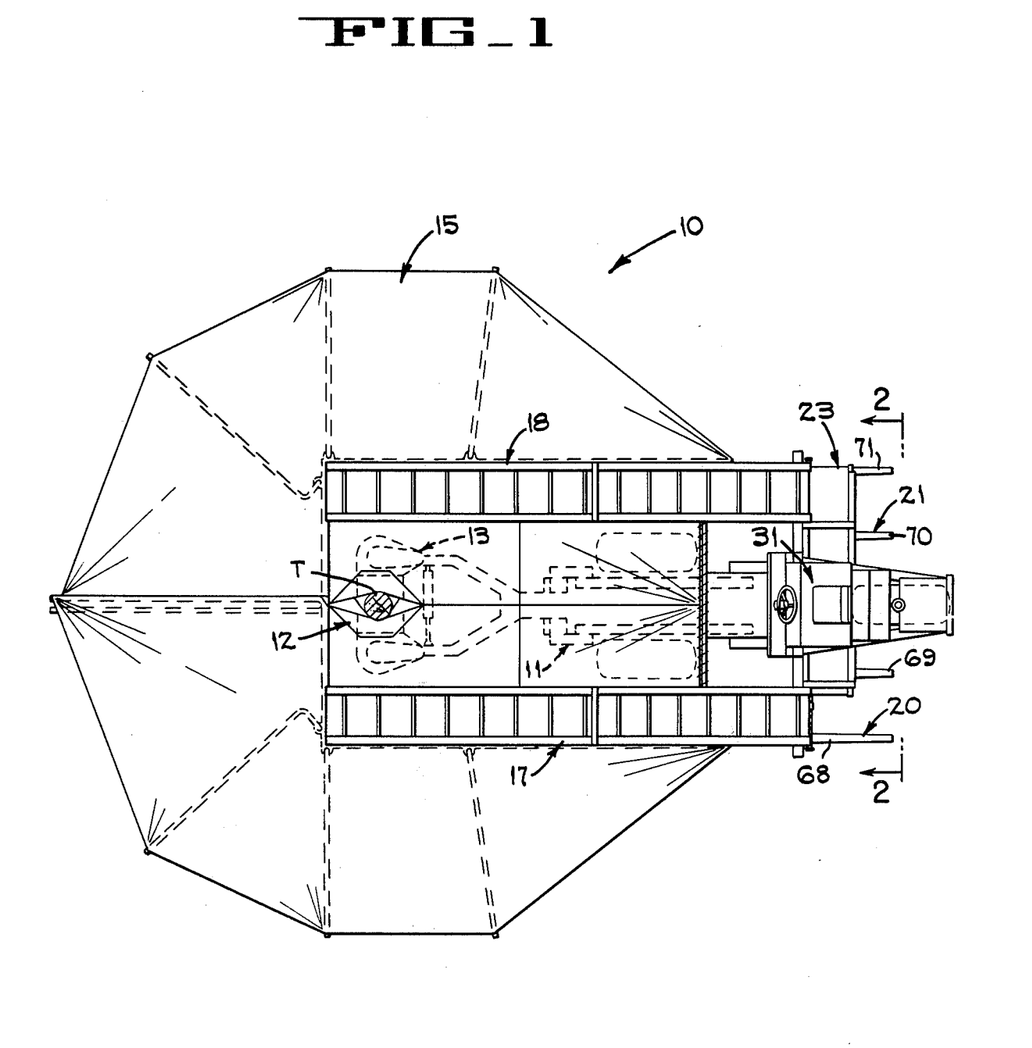
FIG. 1 is a plan view of a harvester equipped with the subject invention.

Referring first to FIG. 1, the major subassemblies of the improved fruit harvester 10 will be identified. The improved fruit harvester 10 includes a self-propelled main frame 11, a tree grasping means 12 projecting from the front end of the main frame and adapted to engage a fruit tree T from which fruit is to be harvested, shaking means 13 mounted within the grasping means 12 and adapted to induce vibration in the tree T sufficient to cause fruit to fall from the tree, a retractable collection surface 15 extending from the front end of the main frame and adapted to collect the fruit as it falls from the tree T, and a pair of parallel longitudinal conveyors 17, 18 disposed on either side of the main frame and adapted to receive the fruit from the collection surface and transport the fruit to the rear of the harvester 10. The subassemblies referred to so far are well described in the aforementioned U.S. patent issued to Adrian U.S. Pat. No. 3,596,455 which is specifically incorporated herein by reference for a further and more complete description of such apparatus.

The improvement in the harvester of the present invention lies in certain modifications and additions made to the rear end thereof. Specifically, a movable conveyor assembly 23 is suspended from the rear of the main frame 11 in a transverse manner which allows the transverse conveyor to selectively receive fruit from either the longitudinal conveyor 17 or the opposite longitudinal conveyor 18. Additionally, two lifting fork assemblies 20, 21 have been elevatably attached to the rear of the main frame 11 and are located respectively beneath the termination points of the longitudinal conveyor 17 and the longitudinal conveyor 18.

Figure 2:
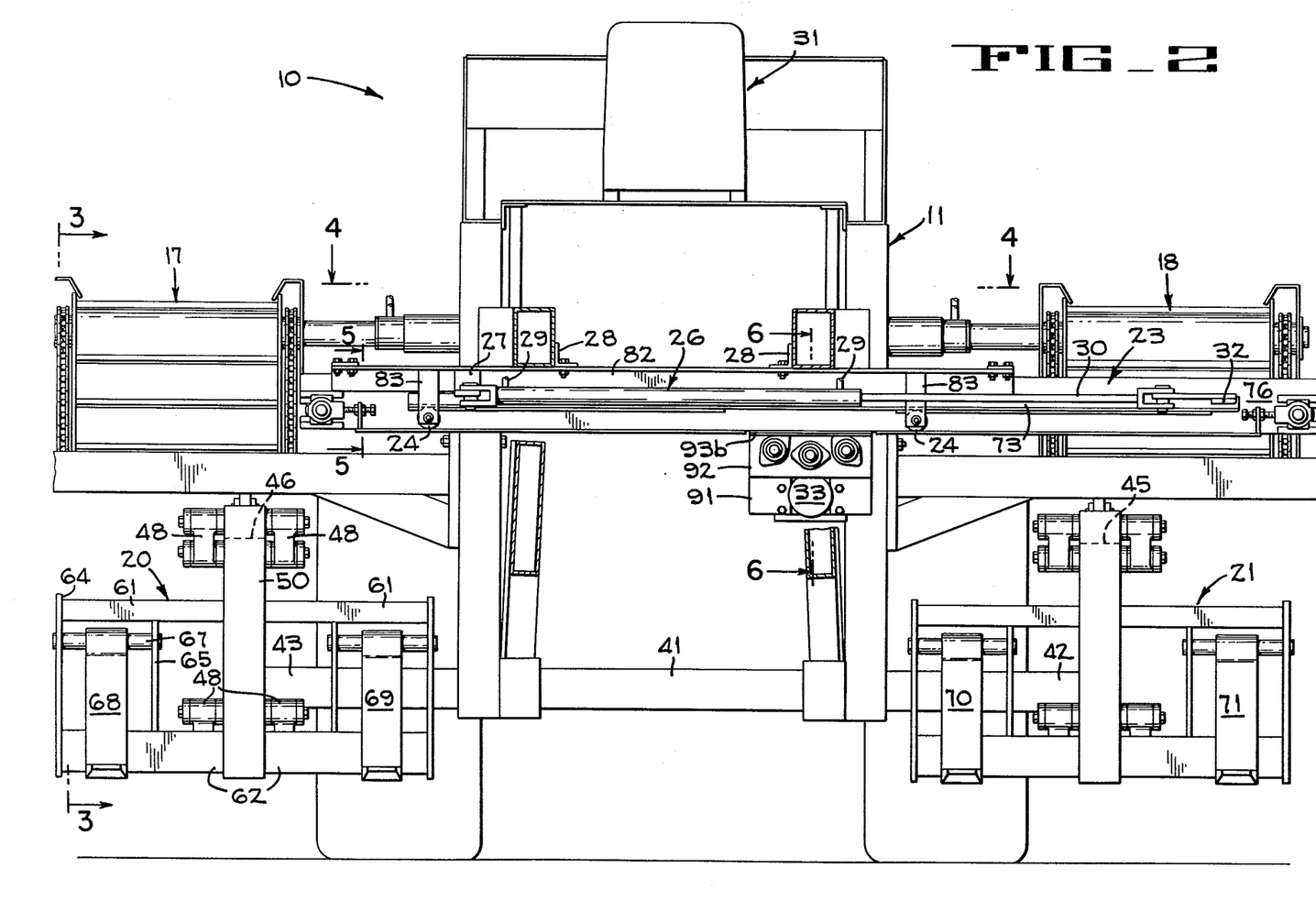
FIG. 2 is an enlarged section taken along line 2—2 of FIG. 1 presenting generally a rear elevation of the harvester.
Figure 5:
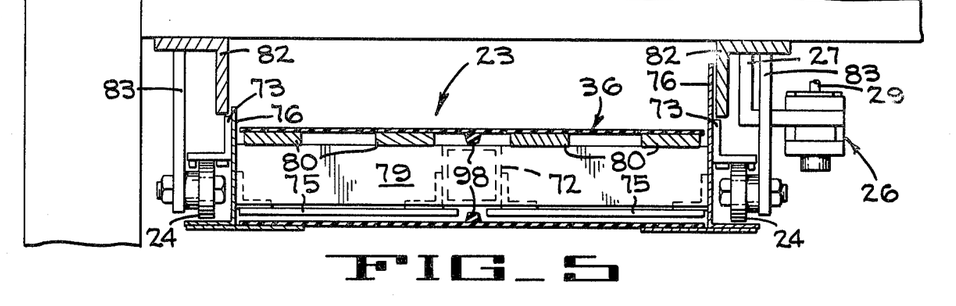
FIG. 5 is an enlarged transverse section of the subject transverse conveyor assembly taken along line 5—5 of FIG. 2.

As shown in FIGS. 2 and 5, the transverse conveyor assembly 23 is slidably supported from the main frame 11 by a plurality of rollers 24 in a manner that allows said conveyor assembly 23 to assume a first position so that the conveyor assembly will receive fruit from the longitudinal conveyor 17 and a second position so that the conveyor assembly will receive fruit from the longitudinal conveyor 18. The conveyor assembly 23 is shown in its second position in FIG. 2. Each lifting fork assembly 20, 21 is adapted to support a bin, or receptacle, 22 (FIGS. 9 and 10) to collect fruit deposited by the associated longitudinal conveyor (17 or 18) and the transverse conveyor assembly 23. When the transverse conveyor assembly 23 is shifted fully to its first position, fruit from the longitudinal conveyor 17 is diverted by the conveyor assembly 23 and deposited thereby in the bin 22 mounted on the lifting fork assembly 21. Additionally, fruit from the longitudinal conveyor 18 is deposited directly into the bin 22 mounted on the lifting fork assembly 21. Conversely, when the conveyor assembly 23 is shifted to its second position (as shown in FIG. 2), fruit from both longitudinal conveyors 17, 18 is directed to the bin 22 mounted on the lifting fork assembly 20. The manner of operation will be described in greater detail in connection with FIGS. 9 and 10 hereinafter.

Figure 6:
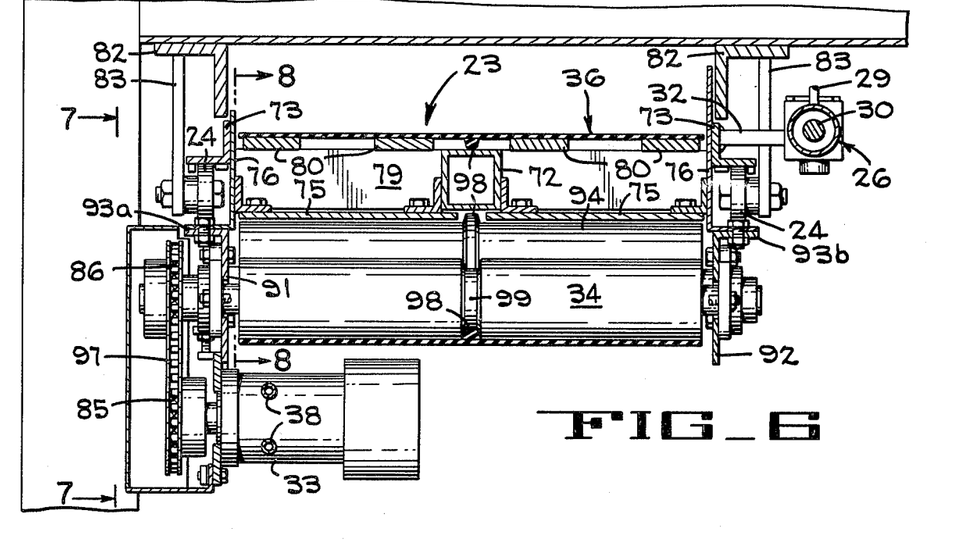
FIG. 6 is an enlarged transverse section of the subject transverse conveyor assembly taken along line 6—6 of FIG. 2.

In order to shift the transverse conveyor assembly 23 between its two operative positions, a double-acting hydraulic piston and cylinder assembly 26 of conventional construction is pivotally attached at the cylinder end to the main frame 11 as shown in FIGS. 2 and 5. Thus, the cylinder end has a clevis which is pivotally attached to an L-shaped support member 27 which, in turn, is suspended from a transverse support beam 82. The support beam 82 is suspended from the main frame 11 by two angle brackets 28 (FIG. 2). A piston rod 30, reciprocatably mounted within the cylinder assembly 26 and projecting therefrom, is pivotally attached to a laterally projecting arm 32 which is fixed to the side of the conveyor assembly 23 as shown in FIG. 6. The cylinder assembly 26 is connected to a hydraulic pump (not shown) by flexible conduit (not shown) terminating at a pair of hydraulic ports 29 (FIG. 2) and is actuated by a control lever (not shown) located near the harvester driver who sits at location 31 directly above the transverse conveyor assembly 23.

A hydraulic motor 33 (FIGS. 2 and 6) is suspended from the center of the transverse conveyor assembly 23 and powers a drive roller 34 which is adapted to drive an endless conveyor belt 36 mounted within the conveyor assembly 23. The hydraulic motor 33 is powered by a hydraulic pump (not shown) connected to the motor by flexible conduit (not shown) terminating at a pair of hydraulic ports 38 shown on FIG. 6. The hydraulic motor 33 is located in the center of the transverse conveyor assembly so that, regardless of the position of the transverse conveyor assembly, the motor will never be placed above either of the fruit bins. This is done so that any hydraulic fluid leaks from the motor 33 or the attached hydraulic lines will not result in contamination to fruit contained in the bins. The conveyor belt drive assembly is described in greater detail in connection with FIGS. 7 and 8 hereafter.

Figure 3:
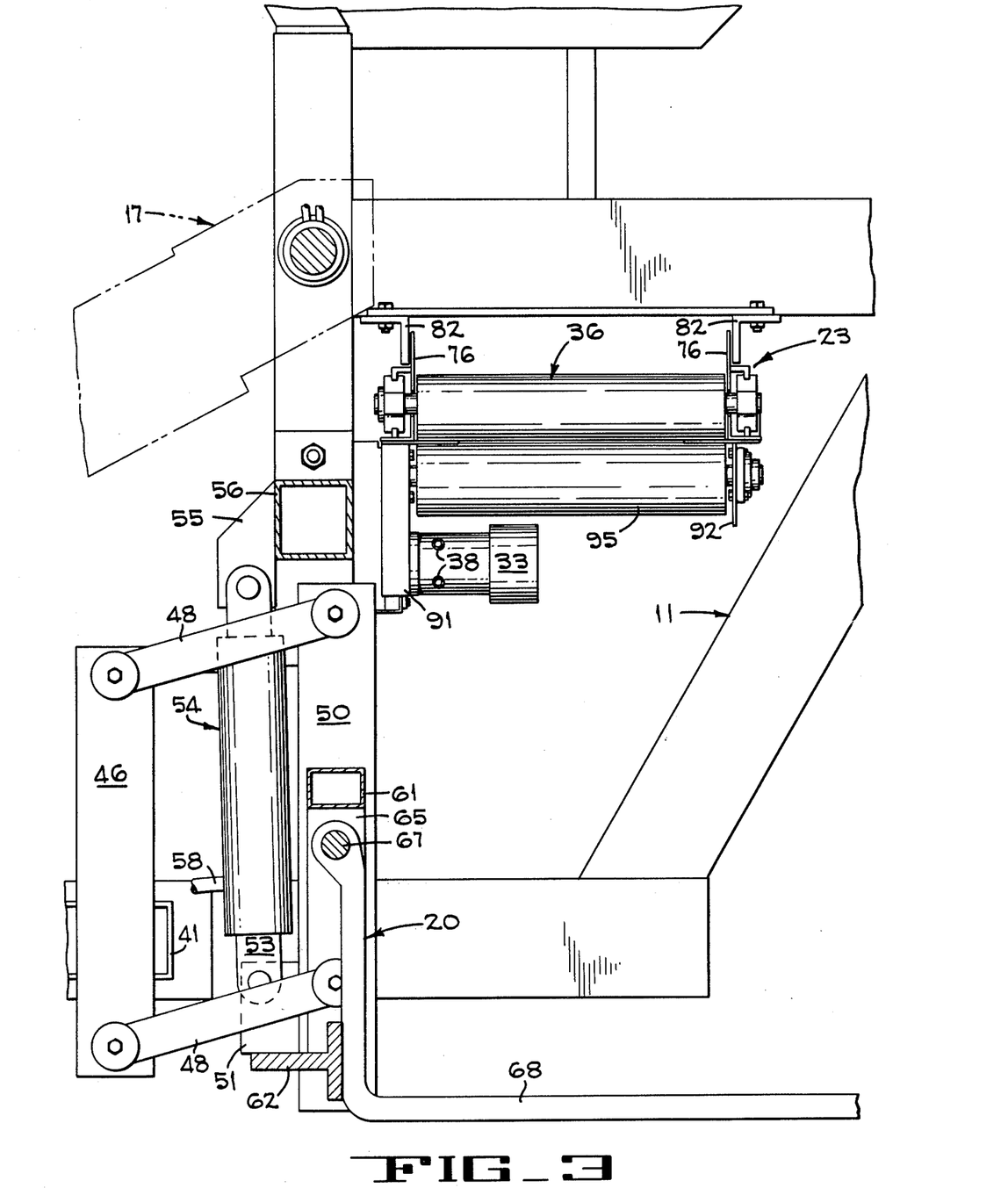
FIG. 3 is an enlarged fragmentary section taken along line 3—3 of FIG. 2.

As shown in FIGS. 2 and 3, a horizontal support beam 41 is attached to the main frame 11 at the lower end thereof with one end 42 of the beam terminating generally beneath the longitudinal conveyor 18 and the other end 43 terminating generally beneath the longitudinal conveyor 17. For supporting the lifting fork assemblies, a first vertical support post 45 is attached to the end 42 of the horizontal support beam and a second vertical support post 46 is attached to the end 43 of the horizontal support beam. FIG. 3 depicts the lifting fork assembly 20. The construction of the other lifting fork assembly 21 is identical and the remaining discussion will be limited to said lifting fork assembly 20 which is supported from the vertical support post 46. Four generally horizontal support arms 48 are pivotally attached to upper and lower portions of the vertical support post 46 at one end and are pivotally attached to a movable vertical support post 50 at their opposite ends. In this manner, the movable vertical support post 50 is capable of vertical movement relative to the fixed vertical support post 46 while both vertical posts 46, 50 are maintained parallel to one another in their vertical orientation. A bracket 51 (FIG. 3) is attached to the lower portion of the movable vertical support member 50 and protrudes toward the front of the harvester. A piston rod 53 is pivotally attached to the bracket 51 and adapted to freely reciprocate within a piston and cylinder assembly 54. The piston and cylinder assembly 54 is pivotally attached at the cylinder end to a second bracket 55 projecting from the main frame at 56. The piston and cylinder assembly 54 is driven by a hydraulic pump (not shown) connected by means of flexible conduit (not shown) terminating at a pair of hydraulic connections 58 (one only shown in FIG. 3). A control lever (not shown) located near the harvester driver (at 31) is included in the hydraulic circuit in a conventional manner and allows the driver to raise and lower the fork assembly 20. A pair of upper horizontal support beams 61 extend from either side of the movable vertical support post 50 above its midsection and a pair of lower horizontal T-beams 62 extend from either side of the movable vertical support post 50 at its lower end. A first vertical support plate 64 (FIG. 2) extends between the termination of one of the upper horizontal support beams 61 and the termination of the associated lower horizontal T-beam 62. A second vertical support plate 65 extends between the upper horizontal support beam 61 and the lower horizontal T-beam 62 at a point inward from the first vertical support plate 64. A horizontal support rod 67 extends between the first vertical support plate 64 and the second vertical support plate 65 and is attached thereto at each end. A single L-shaped fork 68 is pivotally attached to the support rod 67 (FIG. 3) and is adapted to contact the lower horizontal T-beam 62 so that rotation about the support rod is limited. In this manner, the fork generally rests in the position illustrated in FIG. 3 but is able to pivot upward when caused to do so by external forces. Each of the other three forks 69, 70, 71 (FIG. 2) is mounted in a manner similar to that described for the single fork 68 and the foregoing description applies equally well to them. The operation of the lifting fork assemblies 20, 21 will be described in detail hereinafter in connection with FIGS. 9 and 10.

Figure 4:
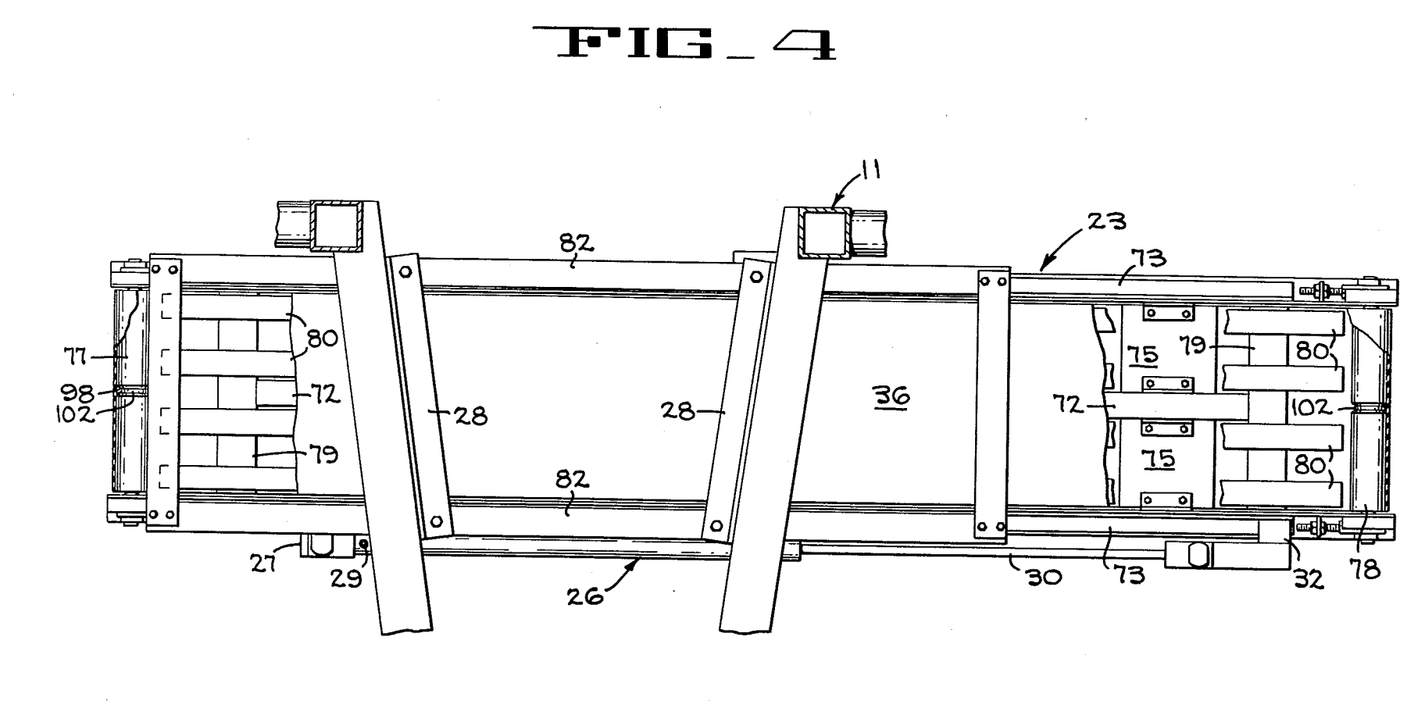
FIG. 4 is an enlarged horizontal section taken along line 4—4 of FIG. 2, showing the subject transverse conveyor with portions thereof being broken away.

As shown in FIGS. 4 and 5, the transverse conveyor assembly 23 includes a frame comprising a single central box beam 72 which extends the length of the conveyor assembly, a series of struts 75 attached to said box beam 72 and extending outward from both sides of said box beam at the lower face thereof, and a pair of longitudinal angle frame members 73 attached to the ends of said struts on either side of said box beam through side frame members 76 (as shown in FIG. 5), such angle frame members 73 being adapted to ride upon the upper surfaces of the support rollers 24 which thereby provide rolling support for the entire conveyor assembly. A pair of end rollers 77, 78, located respectively at the left and right ends of the conveyor assembly (FIG. 4), extend between the parallel side frame members 76 and are adapted to support the endless conveyor belt 36 as it is driven around the conveyor assembly. A plurality of support members 79 extend transversely between and are attached to the side frame members 76 at points equally spaced along the length of the conveyor assembly, the two end support members (at the ends of the box beam 72) being shown in FIG. 4. On top of the support members 79 are attached a plurality of longitudinal support slats 80 running the length of the conveyor assembly 23 and being adapted to support the underside of the upper reach of the endless conveyor belt 36.

In order to support the conveyor assembly 23 for shiftable movement, the previously mentioned pair of transverse support beams 82 are attached to the main frame 11 at laterally spaced positions as shown in FIGS. 4 and 6. The conveyor assembly support rollers 24 are suspended from the transverse support beams 82 by means of a plurality of vertical hangers 83 (FIG. 6) attached at their upper ends to the transverse support beams. The support rollers 24 are rotatably attached to the lower ends of the hangers 83. This manner of support allows the conveyor assembly 23 to freely move between positions at each side of the apparatus, as described hereinbefore.

Figure 7:
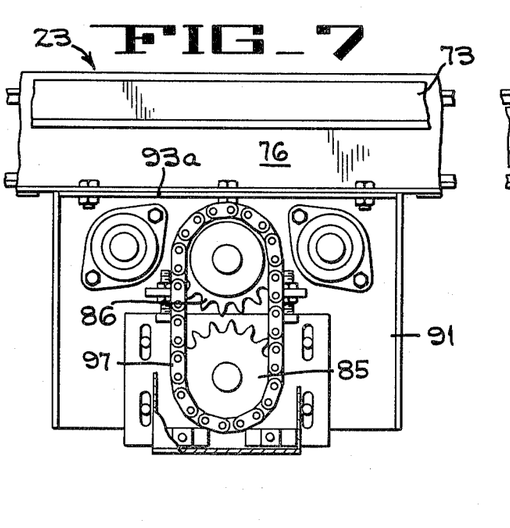
FIG. 7 is an end elevation of the transverse conveyor drive mechanism taken in the direction of arrows 7—7 of FIG. 6 with portions thereof being broken away.
Figure 8:
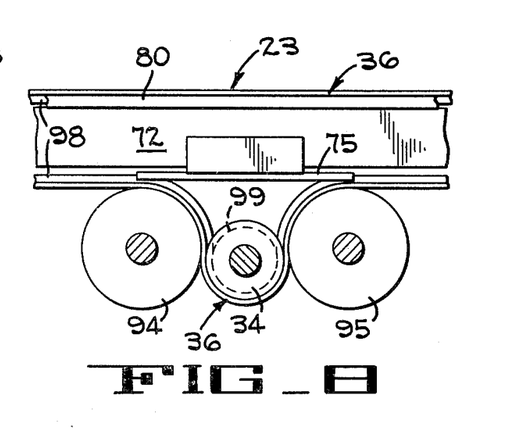
FIG. 8 is a section taken along line 8—8 of FIG. 6.

As shown in FIGS. 6, 7 and 8 the conveyor drive mechanism comprises the hydraulic motor 33 which is suspended from the conveyor assembly 23 by means of a front bracket plate 91 and which is operated to drive a drive sprocket 85. The drive sprocket 85 induces rotation in a pickup sprocket 86 which, in turn, drives the drive roller 34 rotatably mounted between the front bracket plate 91 and a rear bracket plate 92 (FIG. 6). The front bracket plate 91 is suspended from one of the side frame members 76 by means of an outwardly turned flange 93a at the upper end thereof. The rear bracket plate 92 is suspended from the other side frame member 76 by means of an outwardly turned flange 93b at the upper end thereof. A pair of freely-rotating idler rollers 94, 95 extend between the mounting bracket plates 91, 92 in parallel to the drive roller 34 with the diameters of the idler rollers 91 and 92 being the same as one another and greater than the diameter of the drive roller 34 (FIG. 8). The three rollers together are positioned generally side-by-side so that the conveyor belt 36 may be threaded over the top of the first idler roller 94 (FIG. 8), then threaded beneath the drive roller 34 and finally threaded above the second idler roller 95. In this manner, sufficient friction is maintained between the conveyor belt 36 and the drive roller 34 in order to drive the conveyor belt in direct correspondence with the rotation of the drive sprocket 85 of the motor 33. A drive chain 97 connects the drive sprocket 85 to the pick up sprocket 86, as shown in FIG. 7. The endless conveyor belt 36 forms a continuous loop with a central inner rib 98 being provided midway between the edges of the belt and parallel thereto. The rib 98 is received within an annular channel 99 impressed around the middle of the drive roller 34 (FIG. 6). Similar channels 102 (FIG. 4) are found in the end rollers, 77 and 78, and together these channels function to assure the alignment of the conveyor belt 36 as it circulates around the conveyor assembly 23.

Figure 9:
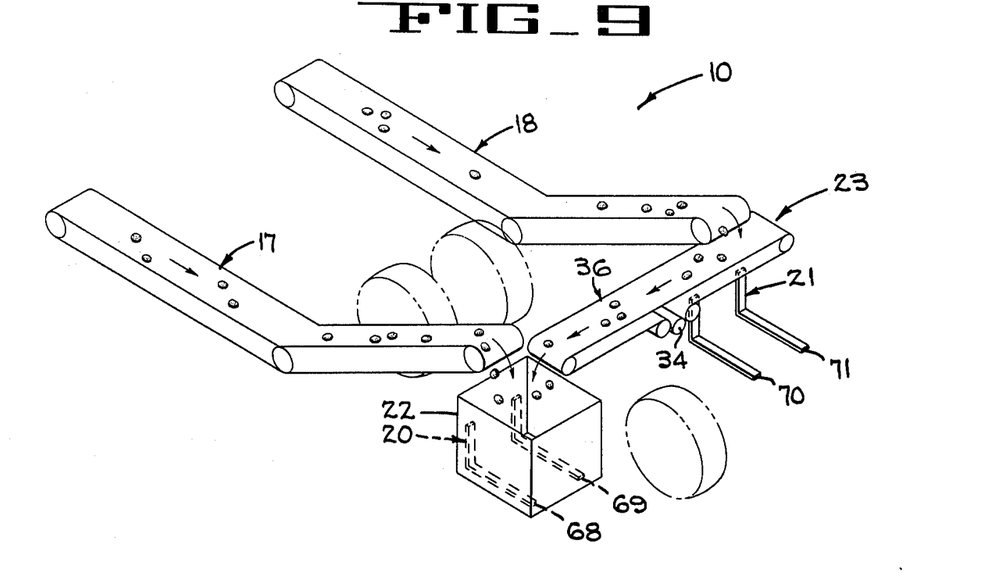
FIG. 9 is a schematic representation illustrating a first configuration of the subject invention.
Figure 10:
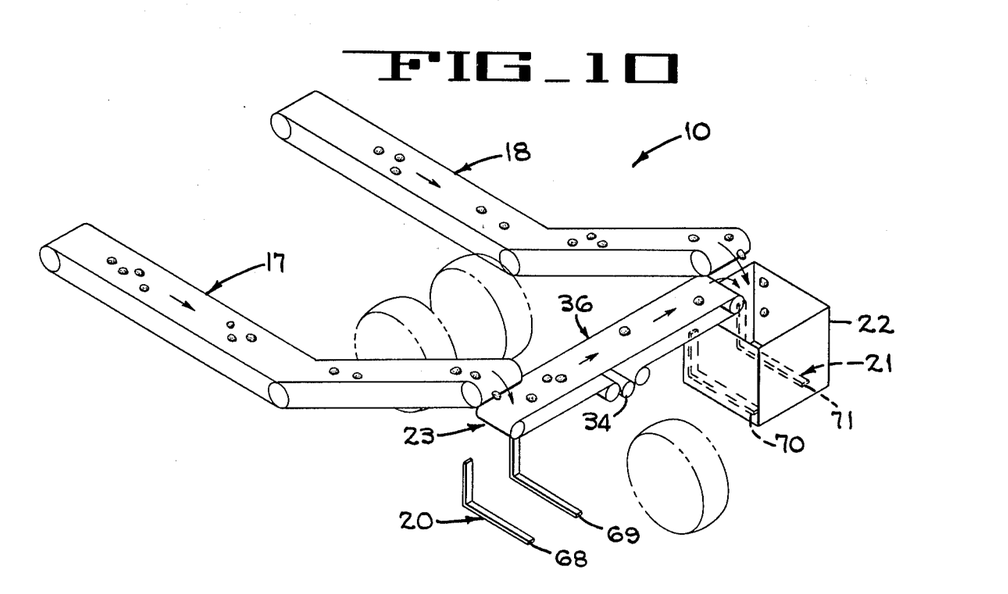
FIG. 10 is a schematic representation illustrating a second configuration of the subject invention.

The operation of the harvester 10 is conventional insofar as the steps of approaching a tree, grasping the tree, extending the retractable collection surface 15, shaking the tree, and collecting the fruit on the two parallel longitudinal conveyors 17, 18 is concerned. These steps are well described in the aforementioned U.S. Pat. No. 3,596,455 issued to Adrian. The operation of the transverse conveyor of the present invention is illustrated in FIGS. 9 and 10 of the present application. FIG. 9 shows the shuttle conveyor assembly 23 in its right most position where it receives fruit from the right hand side longitudinal conveyor 18 and transports that fruit generally to the left hand side of the machine. The fruit bin 22, which is supported by the left hand side lifting fork assembly 20 is located beneath the termination point of the transverse conveyor assembly 23 and receives fruit therefrom. Fruit collected on the left hand side longitudinal conveyor 17 is fed directly into the bin 22 as shown. FIG. 10 shows the operation of the shuttle conveyor assembly 23 in its alternate, left most position where it is arranged to receive fruit from the left hand side longitudinal conveyor 17. This fruit is transported to the right hand side of the machine by the transverse conveyor belt 36 where it is deposited in the fruit bin 22 supported by the right hand side lifting fork assembly 21. As fruit from the left hand side longitudinal conveyor 17 is directed to the bin 22 by the conveyor assembly 23 as just described, fruit from the right hand side longitudinal conveyor 18 will be fed directly into the bin.

It has been found that a fruit harvester equipped with the present invention is able to harvest fruit more efficiently than was possible before with a dual-conveyor type harvester. Fruit shaken from the tree falls to either the left hand side conveyor 17 or to the right hand side conveyor 18, both of which transfer the fruit to the rear of the harvester. The fruit is then selectively directed to either of two bins 22 located on the right hand side and the left hand side of the harvester respectively. When the first bin is full, the operator shifts the shuttle conveyor assembly in order to begin the filling of the second bin. As the shuttle conveyor assembly 23 passes its center position, the direction of movement of the conveyor belt 36 is automatically reversed by reversing the flow to the hydraulic ports 38 or motor 33 by conventional control valve means (not shown). Such reversal may be actuated by a conventional limit switch (not shown) arranged to be engaged by the conveyor assembly 33 during its traversing movement. The operator is then able to lower the full bin to the ground by means of the appropriate lift fork assembly 20 or 21 previously described and leave it sitting in the field to be retrieved later by another vehicle. The harvester can continue to pick fruit and store it in the other bin. When the harvester reaches a location where an empty bin is waiting, the operator is able to pick up that bin on the empty lift fork assembly while harvesting and filling of the other bin continues. The location of the lift fork assemblies and their design is such that the operator can, without assistance from other personnel or from a another vehicle on the ground, offload full bins and pick up empty bins.

Although the best mode contemplated for carrying out the present invention has been herein shown and described, it will be apparent that the modification and variation may be made without departing from what is regarded to be the subject matter of the invention.

What is claimed is:

1. In a fruit harvester of a type wherein fruit is shaken from a tree and directed into receptacles, including a main frame movable along a path, means for movably engaging a fruit tree and shaking the tree while so engaged, a collection surface adapted to collect the fruit as it falls from the tree, two parallel conveyors disposed on either side of the main frame and arranged to receive the fruit from said collection surface, said conveyors being adapted to transport the fruit to points behind the collection surface and terminating at locations on opposite sides of the main frame, the improvement comprising:

means for supporting two receptacles so that a first receptacle will be located beneath the termination point of one conveyor and a second receptacle will be located beneath the termination point of the other conveyor, and means for selectively intercepting fruit from either of the two parallel conveyors, but not from both of the parallel conveyors simultaneously, and transporting that fruit so that it is deposited in the receptable associated with the opposite conveyor.

2. A fruit harvester as described in claim 1, wherein the means for supporting the two receptacles comprises two pairs of forks, each pair including independently operable control means so that either receptacle may be loaded onto or unloaded from the harvester without disturbing the other receptacle.

3. A fruit harvester as described in claim 1, wherein the means for selectively intercepting fruit from either conveyor and transporting said fruit to the opposite receptacle comprises:

a transversely mounted, endless conveyor;

means attached to the frame of the harvester for movably supporting said transversely mounted, endless conveyor generally between the termination points of the parallel conveyors;

means for selectively shifting the position of said transverse conveyor between a position where the conveyor is situated to receive fruit from said one parallel conveyor and deposit that fruit into the receptacle at the termination point of the other parallel conveyor and a position where the transverse conveyor is situated to receive fruit from the said other parallel conveyor and deposit that fruit into the receptacle at the termination point of the said one parallel conveyor; and means for driving said transverse conveyor so that the fruit may be selectively transported in either direction.

4. A fruit harvester as described in claim 1, wherein the parallel conveyors terminate at points located at the rear of the harvester and on either side thereof and the means for supporting the receptacles are located at the rear corners of the harvester.

5. In a fruit harvester of the type wherein fruit is shaken from a tree and collected into receptacles, a main frame movable along a path, including means for movably engaging a fruit tree and shaking the tree while so engaged, a collection surface adapted to collect the fruit as it falls from the tree, two parallel side conveyors disposed on either side of the main frame and arranged to receive the fruit from said collection surface, said side conveyors being adapted to transport the fruit to points behind the collection surface and terminating at locations on opposite sides of the main frame, the improvement comprising:

means for supporting two receptacles so that one receptacle will be disposed beneath the termination point of one side conveyor and the other receptacle will be disposed beneath the termination point of the other side conveyor, a transverse conveyor assembly including an endless conveyor, means attached to the frame of the harvester for movably supporting said transverse conveyor assembly so that said conveyor assembly is generally located between the termination points of the two parallel side conveyors, means for selectively shifting the position of the transverse conveyor assembly between a first position where the transverse conveyor assembly is situated to receive fruit from said one side conveyor and deposit that fruit into the receptacle at the termination point of the other side conveyor, but where fruit from the other side conveyor is able to fall freely into the receptacle disposed therebeneath, and a second position where the transverse conveyor assembly is situated to receive fruit from said other side conveyor and deposit that fruit into the receptacle at the termination point of said one side conveyor, but where fruit from said one side conveyor is able to fall freely into the receptacle disposed therebeneath, means for driving said endless conveyor so that the fruit may be selectively transported in either direction.

6. A fruit harvester as in claim 5, wherein the means for supporting the transverse conveyor assembly comprises:

a plurality of rollers attached to the harvester frame, a conveyor frame adapted to house the endless conveyor, said conveyor frame being supported by the rollers attached to the harvester frame.

7. A fruit harvester as in claim 6, wherein the endless conveyor is powered by a hydraulic motor attached to the conveyor frame.

8. A fruit harvester as in claim 5, wherein the means for shifting the transverse conveyor assembly comprises a dual-acting hydraulic cylinder, one end of which is attached to the transverse conveyor assembly and the other end of which is attached to the harvester main frame.

9. A fruit harvester as in claim 5, wherein the means for driving the transverse endless conveyor is a hydraulic motor mounted on the transverse conveyor assembly at its center so that the hydraulic motor is never located above either of the fruit receptacles.

10. A fruit harvester as in claim 5, wherein the parallel side conveyors terminate at points located behind the rear wheels of the harvester and on either side of the frame, and the means for supporting the receptacles are located at the rear corners of the harvester.

* * * * *